United States Patent [19]

Carraro et al.

[11] Patent Number: 5,658,510
[45] Date of Patent: Aug. 19, 1997

[54] PROCESS FOR THE PREPARATION OF A FLEXIBLE THERMOPLASTIC COMPOSITE FILAMENT CONTAINING CONTINUOUS FIBRES

[75] Inventors: Claudio Carraro, Mirano; Alessandro Moro, Cazzago di Pianiga; Adriano Ferrari, Novara, all of Italy

[73] Assignee: Enichem S.p.A., Milan, Italy

[21] Appl. No.: 516,701

[22] Filed: Aug. 18, 1995

[30] Foreign Application Priority Data

Sep. 6, 1994 [IT] Italy .................. MI94A1823

[51] Int. Cl.[6] .................. B29C 47/02; B29C 70/52; B32B 1/10; B32B 31/30
[52] U.S. Cl. .................. 264/70; 264/129; 264/131; 264/171.13; 264/171.23; 427/185; 427/195; 427/301; 427/412.1; 427/434.5
[58] Field of Search .................. 264/70, 129, 131, 264/171.13, 171.23, 211.14; 427/180, 185, 195, 301, 412.1, 434.5

[56] References Cited

U.S. PATENT DOCUMENTS

| 3,742,106 | 6/1973 | Price .................. 264/131 |
| 3,855,175 | 12/1974 | Kakizaki .................. 523/213 |
| 4,426,469 | 1/1984 | Marzola et al. .................. 523/209 |
| 4,429,064 | 1/1984 | Marzola et al. .................. 523/213 |
| 4,539,249 | 9/1985 | Curzio .................. 428/175 |
| 4,614,678 | 9/1986 | Ganga .................. 428/74 |
| 4,699,579 | 10/1987 | Bourdon et al. .................. 425/113 |
| 4,713,139 | 12/1987 | Ganga .................. 264/131 X |

FOREIGN PATENT DOCUMENTS

| 138294 | 4/1985 | European Pat. Off. . |
| 188939 | 7/1986 | European Pat. Off. . |
| 190522 | 8/1986 | European Pat. Off. . |
| 599404 | 6/1994 | European Pat. Off. . |
| WO86/0032 | 1/1986 | WIPO . |

OTHER PUBLICATIONS

European Search Report, E 95 11 2389, 6 Mar. 96.
Abstract of Japan 5-269,739 (Published Oct. 19, 1993).

*Primary Examiner*—Leo B. Tentoni
*Attorney, Agent, or Firm*—Waton Cole Stevens Davis, P.L.L.C.

[57] ABSTRACT

Process for the preparation of a flexible, thermoplastic, composite filament, containing continuous fibers basically consisting of a flexible sheath made of polyolefinic resin which covers a bundle of fibers impregnated with a polyolefmic resin, wherein the inorganic fibers are treated with a solution containing additives which improve the compatibility between reinforcement and polymeric matrix after transformation into end products.

10 Claims, 1 Drawing Sheet

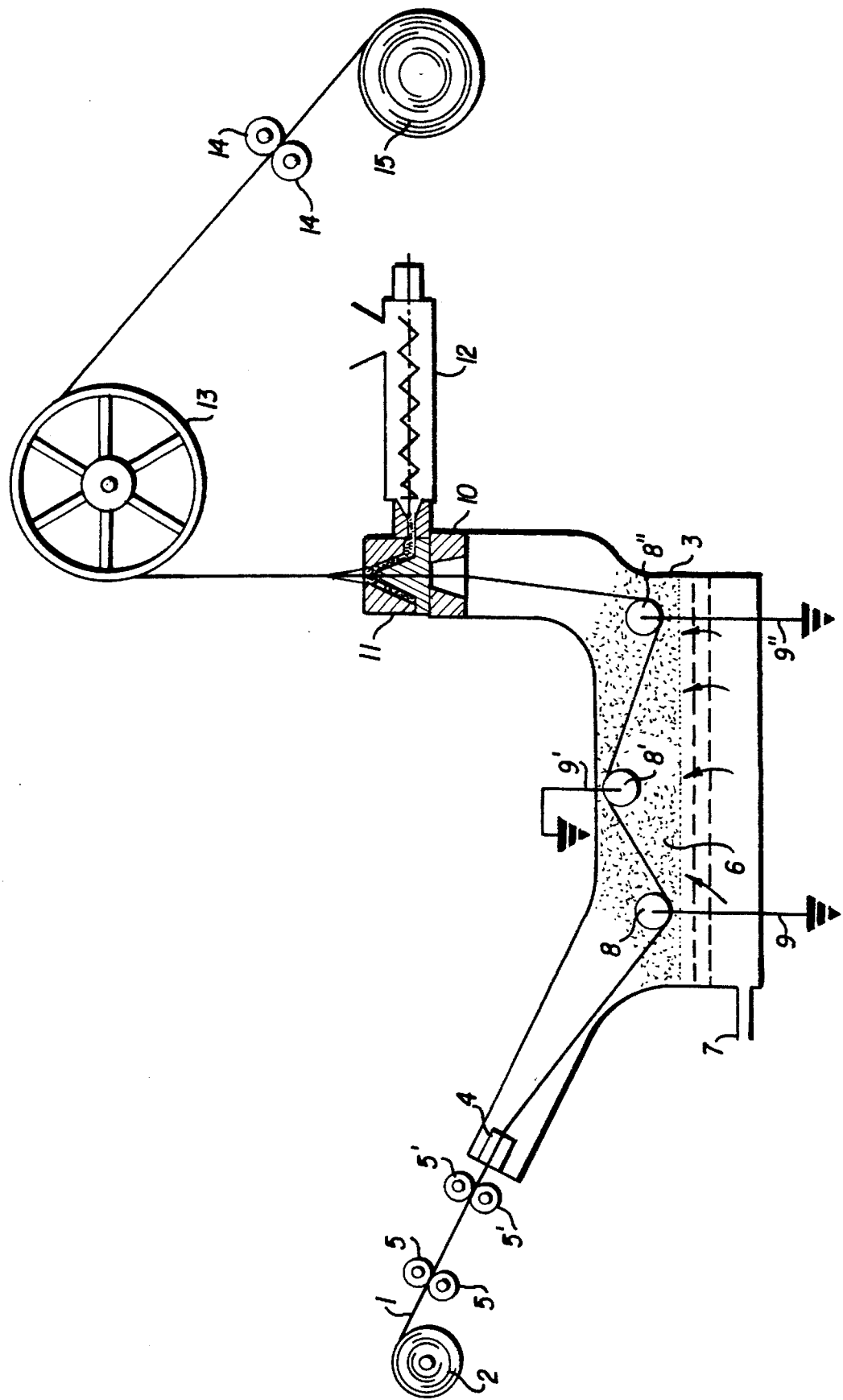

PROCESS FOR THE PREPARATION OF A FLEXIBLE THERMOPLASTIC COMPOSITE FILAMENT CONTAINING CONTINUOUS FIBRES

BACKGROUND OF THE INVENTION

1. Field of the Invention

The present invention relates to a process for the preparation of a flexible thermoplastic composite filament containing continuous fibres.

More specifically, the present invention relates to a process for the preparation of a flexible thermoplastic composite filament consisting of bundles of continuous fibres of any kind, either mineral, organic or metallic, impregnated with a thermoplastic polyolefinic resin in powder form and/or in fibres and covered with an external flexible thermoplastic sheath which is also polyolefinic.

2. Description of the Prior Art

In many applications, formally dominated by the use of metallic materials, composite materials have been proposed basically consisting of a polymeric matrix and an inorganic reinforcement, mainly glass or carbon fibres. In conditions which require particularly high performances, from the point of view of mechanical resistance, composite materials are proposed with a long or, above all, continuous fibre.

The first type of composite material with a long or continuous fibre, developed as an alternative to metallic materials, was characterized in that it had a matrix consisting of thermosetting polymers, of which epoxy resins, unsaturated polyester resins and bismaleimides are typical examples.

End products made of these materials are obtained by impregnating and/or pre-impregnating the fibres with the monomer and/or a prepolymer and subsequently forming the material with technologies such as manual stratification, winding, pultrusion and moulding in a press or autoclave.

In each case the fibres are passed through solutions of the thermosetting resin with consequent problems of environment and process costs due to the necessity of arranging the reuse and/or storage of the solvents used.

To overcome this type of inconvenience, composite materials have quite recently been introduced which use thermoplastic polymers as matrix. In this case the relative transformation technology involves, if the composite is a long or continuous fibre, the preliminary formation of a semifinished product.

An example of the preparation of a semifinished product of this kind is described in U.S. Pat. No. 3,742,106, which discloses the formation of a composite material by the impregnation of a continuous reinforcing filament in a thermoplastic melt.

Another example of semifinished product for composites with a thermoplastic matrix is described in Journal of Applied Polymer Science—Applied Polymer Symposium, vol. 47, page 501, 1991, which discloses the preparation of a continuous filament by the spinning of a mix consisting of reinforcing and thermoplastic fibres.

U.S. Pat. No. 4,614,678 describes the formation of a composite by the impregnation of a bundle of reinforcement fibres with thermoplastic powders and the covering of the bundle with a sheath which is also thermoplastic.

More specifically, the process described in this patent comprises:

unrolling a continuous filament, consisting of a bundle of fibres, for example glass or carbon fibres, from a bobbin;

feeding the filament to a closed chamber, inside which a thermoplastic polymer in powder form is maintained in a fluidized state by means of gas;

opening, inside the chamber, the bundle of filaments basically into single fibres;

drawing the opened filament through the fluidized polymer for a time which is sufficient for particles of polymer to be deposited around the single fibres;

reclosing the filament and enclosing it with a protective flexible sheath of thermoplastic polymer preferably of the same kind as the powder polymer.

After obtaining the semifinished products, units are produced with consolidation techniques which can involve heating and pressure application, as described for example in various items of the Encyclopedia of Composites, prepared by S. M. Lee, published by VCH Publishers, New York, 1990–1991, or the pultrusion of the semifinished products themselves.

The use of thermoplastic composites undoubtedly produces improvements from an environmental point of view as no solvents are involved in the production cycles. Problems do arise however in the transformation into end products, above all when the composite material consists of a continuous glass multifibre filament impregnated and covered with a polyolefin such as polyethylene. In this case, there are problems of compatibilization between the polyolefinic matrix and reinforcement.

It is known, in fact, that to improve adhesion between a reinforcement fibre, particularly glass fibre, and a polymeric matrix, it is necessary to modify the surface of the fibre with substances, for example of the silanic or aminic type, which, by interacting between the reactive sites present on the fibre and reactive groups present in the polymer, produce strong bonds which considerably improve the compatibility between matrix and reinforcement. This surface treatment of the fibre, known as chemical finishing, is amply described in literature, for example in "Reinforced Plastics and Elastomers. Recent Developments", M. W. Ranney, Noyes Data Corporation, 1977, 4.

In the case of the polyolefins, however, owing to the substantial absence of polar or reactive groups in the polymeric chain, the sizing treatment of the fibre alone is not sufficient to guarantee the necessary adhesion between matrix and reinforcement. To overcome this inconvenience a proposal has been made to modify the structure of the olefinic polymer by grafting onto the polymeric chain monomers having polar groups such as maleic acid or anhydride, acrylic or methacrylic acids, etc. The modification operation however has proved to be valid when the polyolefins are mixed in an extruder with short fibres. In this case, in fact, by carrying out the functionalization of the polymer directly in an extruder or by adding a prefunctionalized polymer to the mixture to be treated, it is possible to have a dynamic contact, guaranteed by the extruder itself, between fibre and polymeric matrix which favours the chemical bond between the size of the fibre and the polar groups grafted to the polyolefin.

On the contrary, in the case of composites with a continuous fibre the functionalization of the polyolefin has proved to be ineffective as subsequent transformation technologies of the semifinished products do not permit the above dynamic contact necessary for the compatibilization between reinforcement and polymeric matrix. On the basis of this, the use of polyolefins, and in particular polyethylene, for the preparation of thermoplastic composites reinforced with continuous glass fibres has had little success in the past.

SUMMARY OF THE INVENTION

The Applicant has now found a process for preparing a flexible thermoplastic composite filament with a polyolefinic base and containing continuous fibres which, being capable to favour and improve the adhesion between fibrous reinforcement and polymeric matrix during the moulding phase, allow the production of endproducts having high mechanical performances.

BRIEF DESCRIPTION OF THE DRAWING

FIG. 1 is a schematic diagram illustrating the preparation of the flexible composite of the present invention.

The present invention therefore relates to a process for the preparation of a flexible, thermoplastic composite filament, containing continuous inorganic fibres basically consisting of a flexible sheath in polyolefinic resin which covers a bundle of fibres impregnated with a polyolefinic resin, which comprises:

a) unrolling a filament, consisting of a bundle of continuous inorganic fibres, from a bobbin;

b) opening the bundle into the single fibres;

c) wetting the open fibres with a solution basically consisting of:
   i) an organic solvent;
   ii) 1–30% by weight, preferably 3–15%, of at least one additive selected from those having the general formula:

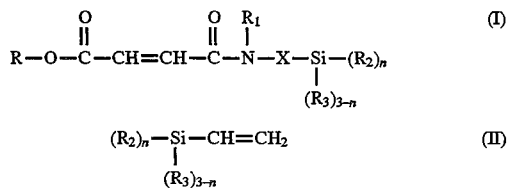

or from ethylenically unsaturated organic compounds containing at least one arthydride, carboxylic or epoxidic function and triallylcyanurate or trimethylallylisocyanurate; and wherein R and $R_1$ represent a hydrogen atom or alkylic radical containing from 1 to 8 carbon atoms, $R_2$ represents an alkoxylic radical containing from 1 to 6 carbon atoms or a halogen, $R_3$ represents an alkyl radical containing from 1 to 8 carbon atoms, X represents a $C_6$–$C_{20}$ aromatic bivalent radical or cycloalkyl radical or $C_4$–$C_{10}$ heterocyclic radical or a radical having the formula

wherein $R_4$ is a hydrogen atom or a $C_1$–$C_{18}$ alkyl radical, n is an integer between 1 and 3, extremes included, m is an integer between 1 and 4, extremes included;

iii) 0–10% by weight, preferably 0.5–5%, of at least one organic peroxide;

d) evaporating the solvent from the wet fibre;

e) impregnating the open filament with a polyolefinic resin in powder form or in the form of a continuous fibre;

f) reclosing the impregnated filament and applying a protective flexible thermoplastic sheath around it in polyolefinic resin preferably of the same kind as the powder polyolefinic resin.

The composite filament of the present invention has a high flexibility which allows it to be twisted, woven to form highly flexible mats or to be used as such to form articles of any kind or dimension, according to the filament winding technique. The filament can have a fibre content of up to 70% in volume, preferably between 40 and 60%.

DETAILED DESCRIPTION OF THE INVENTION

Any kind of inorganic fibre can be used to prepare the composite filament of the present invention. For example glass fibres with a titer of between 150 and 4000 tex.

The opening of the bundle of inorganic continuous fibres can be carried out with a mechanical roll system with a small diameter, a vibrating, pneumatic system etc. When the bundle has been opened, this is ready for the wetting step of the fibres with the solution. This operation can be carried out either by immersing the opened bundle in the solution or drawing the group through two layers of fabric soaked in the solution itself.

The organic solvent suitable for preparing the solution preferably has a low boiling point and must be such as to dissolve both the products of group (ii) and the peroxides of group (iii). Preferred solvents are aliphatic hydrocarbons, such as pentane and hexane, ketones such as acetone, alcohols, such as methanol, ethanol and isopropyl alcohol, esters such as methylacetate or ethylacetate, etc.

Products having general formula (I) which can be used in the process of the present invention are those wherein R and $R_1$ are hydrogen atoms; $R_2$ is —$OCH_3$, —$OC_2H_5$, —$OC_3H_7$, —$OC_4H_9$, X is a propyl; $R_4$ is a hydrogen atom; n is 2 or 3; m is equal to 3. These products are known in literature and available on the market. They can also be synthesized with well-known methods described, for example, in U.S. Pat. No. 4,429,064.

Products with general formula (I) which can be used in the present process are: ethyl triethoxysilane, chloropropyl trimethoxysilane, vinyl triethoxysilane, vinyl trichlorosilane, vinyl triacetoxysilane, vinyl tri (methoxyethoxy)silane, etc.

Finally, examples of ethylenically unsaturated organic compounds containing at least one anhydride, carboxylic or epoxidic function are unsaturated anhydrides such as maleic anhydride, itaconic anhydride, citraconic anhydride, succinic alkenyl anhydrides with a $C_4$–$C_{18}$ alkenylic residue; unsaturated carboxylic acids such as maleic, crotonic, cinnamic, itaconic, acrylic, methacrylic acids; unsaturated epoxides such as glycidyl acrylate, glycidyl methacrylate; etc. Maleic anhydride and acrylic acid are preferred.

Organic peroxides are products used as radicalic initiators in grafting reactions of polyfunctional compounds with polymeric matrixes and have an average half time of between 10 and 200 seconds at temperatures of between 100° and 240° C. at which the grafting reactions generally take place. Examples of peroxides, according to the present invention, are: dicumyl peroxide, 2,5-bis(ter-butylperoxy)-2,5-dimethylhexane, ter-butylperoxybenzoate, ter-butylcumyl peroxide, 1,3-bis(ter-butylperoxy) isopropylbenzene, dibutyl peroxide, 2,5-dimethyl-2,5-bis (ter-butylperoxy)hexine, etc. These peroxides are commercially available and are prepared by AKZO CHEMIE under the trade-names Perkadox BC, Trigonox 101, Trigonox C, Trigonox T, Perkadox 1490, Trigonox B, Trigonox 45.

When the solvent has been evaporated from the bundle, this is then ready for the impregnation of the fibres with the polyolefinic thermoplastic resin in powder form or in the form of continuous fibre.

Any system capable of impregnating continuous fibres with a powder can be used in the process of the present invention.

A valid impregnation system can be that with a fluid bed described in U.S. Pat. No. 4,614,678 which involves passing the open, dry bundle through the powder maintained in a fluid state.

The fluid bed consists of a sealed chamber inside which the polyolefinic resin in powder form is maintained in suspension by air or nitrogen circulation.

The particle size of the powder is not critical but it is preferable to have an average dimension comparable to the diameter of each single fibre. The average diameter of the single particles is generally between 10 and 100 micrometers.

To favour impregnation, the open filament is guided inside the fluid bed with metallic pulleys preferably made of aluminium and asymmetrically arranged inside the sealed chamber, and at least one of these can be electrically connected to earth. The number of pulleys is generally between 2 and 6.

Another system of impregnation involves immersing and drawing the open bundle through a static bed consisting of the polyolefinic resin in powder form contained in a basin subjected to continuous vibration.

The term static bed as used in the present invention and in the claims refers to a bed or a layer of powder wherein the single particles can move freely horizontally whereas the vertical movements are exclusively limited to the thickness of the layer.

The vibrations of the basin containing the polymer in powder form can be obtained mechanically, by oscillating arms, or by means of an electromagnetic head. The intensity of the vibrations is not very high but must be such as to prevent the formation of preferential channels inside the powder during the passage of the bundle.

The impregnation of the inorganic fibres of the bundle with the polyolefinic resin in the form of continuous fibre can be carried out with the method known as "commingling" and described for example in European patent application publication 138.294.

Polyolefinic resins which are particularly suitable for the process of the present invention are polyethylene and polypropylene. More particularly preferred are the polyethylene homopolymer or copolymer of ethylene with 2–25% by weight of at least another $C_3$–$C_{10}$ olefin such as propylene, butene-1, hexene-1, octene-1, etc. The polyolefinic resin has a density of between 0.85 and 0.97 g/cm$^3$, preferably between 0.92 and 0.96 g/cm$^3$. The Melt Flow Index of the polyolefinic resin is generally between 5 and 40 g/10 min.

When the impregnation step has been completed, a protective sheath is applied to the filament. The flexible sheath which covers the bundle of fibres is present in such a way as to have a weight ratio between impregnating material and sheath of between 1:2 and 2:1.

The material of which the sheath is formed is selected from the thermoplastic polyolefins previously listed and can be of the same type or different from that selected for impregnation. Sheaths made of polyolefins which are not only different but also with melting points higher or lower than those of the polyolefins impregnating the bundle, can also be used.

The sheath is applied to the bundle of impregnated fibres with the known extrusion techniques described in European patent application publications 188.939 and 190.522.

According to these techniques the bundle impregnated with powder or polyolefinic fibres is coaxially passed through a tubular die, with a basically circular section, connected to an extruder. The plastic material, extruded with the tubular die, is drawn by a viscous effect during the passage of the bundle and, after a few seconds, cools to form the sheath.

It is also possible to have a composite filament with a transversal section basically elliptic in shape. In this case it is sufficient to have a tubular die with a geometrically rhombus-shaped transversal section.

An alternative method for having the transversal section of the composite filament with a basically elliptical shape involves crushing the impregnated bundle of fibres with a pair of rolls and extruding the sheath by means of a tubular die with a circular section having a diameter which is greater than that of the maximum thickness of the crushed bundle.

The composite material obtained with the process of the present invention has a high flexibility which allows it to be woven to form highly flexible mats or to be used as such to form articles of any shape or dimension, in accordance with the "filament winding" technique.

More specifically the composite material of the invention is suitable to be used as an alternative to metals and relative alloys in the building, transport, airspace industries, etc.

The process for the preparation of the flexible composite materials of the present invention can be better illustrated by referring to the drawing of the enclosed figure, which represents an operative but not limiting example.

A bundle of continuous fibres (1) is unrolled from a bobbin (2) and is fed to sealed chamber (3) through the seal opening (4).

Before entering the chamber, the bundle is opened, basically into its single fibres, using two or more cylinders (5), wetted by means of a passage between two rolls (5') covered with a fabric soaked with the solution of the present invention and then dried with a jet of air not shown in the figure.

Inside the chamber (3), a thermoplastic polyolefin in powder form (6) is maintained in a fluid state by a stream of air or nitrogen fed through the pipe (7).

The open bundle is drawn through the fluid bed by means of pulleys (8), (8') and (8") and, during this passage, the fibres are impregnated with the powder. To favour the impregnation, the pulleys are electrically connected to earth (9, 9' and 9").

The bundle impregnated with the powder leaves the chamber (3) and is reclosed through the seal opening (10) having at the top a tubular die (11), fed by an extruder (12), suitable for covering the impregnated bundle with a flexible sheath made of thermoplastic polyolefin.

The composite filament thus prepared is passed through the pulley (13) to favour the air cooling, then, guided by the rolls (14) is collected onto the bobbin (15).

The following examples which are illustrative but not limiting provide a better understanding of the present invention and its embodiment.

EXAMPLES 1–10

A bundle of glass fibres of 1200 tex of OCF type R25B is unrolled from a bobbin at a rate of 20 m/min and basically opened into its single fibres by passage through a mechanical opener consisting of 4 rolls of 20 mm in diameter. The open bundle is uniformly wetted by passing it between two layers of fabric soaked with an acetone solution containing maleic anhydride (10% by weight) and dicumyl peroxide (2% by weight) and dried with an air jet.

The open bundle is subsequently impregnated by passing it through a fluid bed obtained by bubbling in 1600 l/hour of nitrogen through 900 g of polyethylene (ERACLENE MP 80 of Enichem S.p.A.) in powder form contained in a sealed chamber.

Inside the sealed chamber, the open bundle is guided by three pulleys asymmetrically arranged in such a way that there is always a stretch of filament of about 0.5 meters immersed in the fluid bed.

At the end of the impregnation, a sheath consisting of polyethylene of the type ERACLENE MS 80 of Enichem, is applied to the bundle.

The sheath is applied to the filament by a Maillefer 30 type extruder equipped with a die of the type used in the "sleeving" technique. The diameter of the die is 3.5 mm. The diameter of the chuck is 2.9 mm. The diameter of the filament guide is 2.0 mm. The diameter of the die inlet is 2.4 mm.

With the composite filament thus prepared, test samples were prepared for determining the mechanical characteristics of the moulded material.

Unidirectional plates of 28×28 cm were made with the filament, which were stratified with the sequence [0°, 0°, 90°, 0°]$_{symmetric}$ and compression moulded at 190° and 210° C.

Table I summarizes the final results. For the determination of the shear resistance, reference was made to the method described in "Developments in the Science and Technology of Composite Materials" ECCM5, B. Lauke et al, 1992, page 313, modified for flat test samples having dimensions of 10×10×3.3 mm.

$$(R_2)_n-\underset{(R_3)_{3-n}}{\overset{|}{Si}}-CH=CH_2 \quad (II)$$

and from ethylenically unsaturated organic compounds containing at least one anhydride, carboxylic or epoxidic function and triallylcyanurate or trimethylallylisocysanurate;

and wherein R and $R_1$ represent a hydrogen atom or alkyl radical containing from 1 to 8 carbon atoms, $R_2$ represents an alkoxy radical containing from 1 to 6 carbon atoms or a halogen, $R_3$ represents an alkyl radical containing from 1 to 8 carbon atoms, X represents a $C_6$–$C_{20}$ aromatic bivalent radical or cycloakyl radical or a radical having the formula

wherein $R_4$ is a hydrogen atom or a $C_1$ or $C_{18}$ alkyl radical, n is 1, 2 or 3 m is 1, 2, 3, or 4;

iii) 0–10% by weight of at least one organic peroxide;

d) evaporating the solvent from the wet fiber;

e) impregnating the fibers with a polyolefine resin in powder form or in the form of a continuous fiber; and

| Example | Damping | Fibre wt (%) | Sheath wt (%) | Powder wt (%) | Flexural Strength (*) (MPa) 190° C. | Flexural Strength (*) (MPa) 210° C. | Shear Resistance (MPa) 190° C. | Shear Resistance (MPa) 210° C. |
|---|---|---|---|---|---|---|---|---|
| 1 | — | 64.4 | 25.5 | 10.1 | 147 | 158 | 9.8 | 10.0 |
| 2 | AM 10% | 48.0 | 30.9 | 21.0 | 220 | 228 | 9.2 | 9.6 |
| 3 | SM 5% | 53.6 | 24.7 | 21.7 | 268 | 320 | 11.7 | 10.3 |
| 4 | VTES 5% | 59.3 | 27.8 | 13.0 | 227 | 285 | 9.2 | 9.6 |
| 5 | TAIC 5% | 57.1 | 21.9 | 21.1 | 226 | 254 | 7.5 | 9.1 |
| 6 | AM 10%-DCP 2% | 51.3 | 29.9 | 18.8 | 278 | 300 | 13.3 | 12.5 |
| 7 | SM 5%-DCP 1% | 57.7 | 24.2 | 18.1 | 244 | 270 | 10.4 | 10.2 |
| 8 | VTES 5%-DCP1% | 63.0 | 21.1 | 15.9 | 271 | 268 | 9.2 | 8.3 |
| 9 | TAIC 5%-DCP1% | 58.9 | 25.3 | 15.8 | 244 | 238 | 11.3 | 8.2 |
| 10 | Prosil 5% | 54.2 | 32.4 | 13.5 | 280 | 291 | 11.1 | 11.3 |

*ASTM D790M, distance ratio between supports and 32/1 thickness
AM: maleic anhydride
SM: maleamic silane
TAIC: Triallylisocyaniurate
VTES: Vinyltriethoxysilane
DCP: Dicumyl

We claim:

1. Process for the preparation of a flexible, thermoplastic composite filament, containing continuous inorganic fibers consisting essentially of a flexible sheath of polyolefine resin which covers a bundle of fibers impregnated with a polyolefine resin, which comprises:

a) unrolling a filament, consisting of a bundle of continuous inorganic fibers, from a bobbin;

b) opening the bundle into single fibers;

c) wetting the open fibres with a solution consisting essentially of:

i) an organic solvent;

ii) 1–30% by weight of at least one additive selected from the group consisting of the formula:

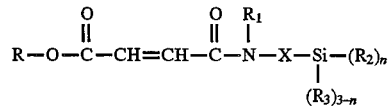

f) redosing the bundle and applying a protective flexible thermoplastic sheath around it.

2. Process according to claim 1, wherein the composite filament has a fibre content of up to 70% in volume.

3. Process according to claim 1, wherein the additives having general formula (I) are those wherein R and $R_1$ are hydrogen atoms; $R_2$ is —OCH$_3$, —OC$_2$H$_5$, —OC$_3$H$_7$, —OC$_4$H$_9$; X is a propyl; $R_4$ is a hydrogen atom; n is 2 or 3; m is equal to 3.

4. Process according to claim 1, wherein the additives having the formula (II) are selected from the group consisting of ethyl triethoxysilane, chloropropyl trimethoxysilane, vinyl triethoxysilane, vinyl trichlorosilane, vinyl triacetoxysilane, and vinyl tri(methoxyethyoxy) silane.

5. Process according to claim 1, wherein the ethylenically unsaturated organic compounds containing at least one anhydride, carboxylic or epoxidic function are selected from the group consisting of: unsaturated arthydrides comprising maleic anhydride, itaconic anhydride, citraconic anhydride, succinic alkenyl anhydrides with a $C_4$–$C_{18}$ alkenylic residue; unsaturated carboxylic acids comprising maleic, crotonic, cinnamic, itaconic, acrylic, methacrylic acids; unsaturated epoxides comprising glycidyl acrylate, and glycidyl methacrylate.

6. Process according to claim 1, wherein the organic peroxides are selected from the group consisting of: dicumyl peroxide, 2.5-bis(ter-butylperoxy)-2,5-dimethylhexane, ter-butylperoxybenzoate, ter butylcumyl peroxide, 1,3-bis (ter-butylperoxy) isopropylbenzene, dibutyl peroxide, and 2,5-dimethyl-2,5-bis(ter-butylperoxy) hexene.

7. Process according to claim 1, wherein the polyolefine resins are polyethylene or polypropylene.

8. Process according to claim 7, wherein the polyolefine resin is the polyethylene homopolymer or copolymer of ethylene with 2–25% by weight of at least another $C_3$–$C_{10}$ olefin.

9. Process according to claim 1, wherein the material of which the sheath is made from thermoplastic polyolefins.

10. Process according to claim 2, wherein the products of formula (I) are those wherein R and $R_1$ are hydrogen atoms; $R_2$ is —$OCH_3$, —$OC_2H_5$, —$OC_3H_7$, —$OC_4H_9$; X is a propyl; $R_4$ is a hydrogen atom; n is 2 or 3; m is equal to 3.

* * * * *